United States Patent [19]

Kimura et al.

[11] Patent Number: 5,194,906
[45] Date of Patent: Mar. 16, 1993

[54] DISTANCE MEASURING DEVICE

[75] Inventors: Kazuaki Kimura; Kaoru Kumagai, both of Tokyo, Japan

[73] Assignee: Kabushiki Kaisha Topcon, Japan

[21] Appl. No.: 755,575

[22] Filed: Sep. 5, 1991

[30] Foreign Application Priority Data

Sep. 10, 1990 [JP] Japan .................................. 2-240369
Sep. 21, 1990 [JP] Japan .................................. 2-253802
Sep. 21, 1990 [JP] Japan .................................. 2-253803

[51] Int. Cl.$^5$ ................................................ G01C 3/08
[52] U.S. Cl. ................................................ 356/5
[58] Field of Search ........................... 356/5, 4.5, 448

[56] References Cited

U.S. PATENT DOCUMENTS

| 4,537,502 | 8/1985 | Miller et al. | 356/5 |
| 4,744,653 | 5/1988 | Sano et al. | 356/5 |
| 4,856,893 | 8/1989 | Breen | 356/5 |
| 4,942,561 | 7/1990 | Ohishi et al. | 356/5 X |
| 5,082,364 | 1/1992 | Russell | 356/5 |

Primary Examiner—Mark Hellner
Attorney, Agent, or Firm—Brumbaugh, Graves, Donohue & Raymond

[57] ABSTRACT

A distance measuring device using two kinds of modulation frequencies is disclosed. More particularly, the distance measuring device is an electro-optical distance meter for measuring a distance by combining the results of fine measurement and rough measurement. The fine measurement is effected by detecting a phase difference between a modulation signal generated from a light emitting device and a reflected modulation signal generated from a light receiving device, while the rough measurement is effected by measuring a lag time between the modulation signal and the reflected modulation signal. Further, the distance may be measured by detecting a phase difference and a lag time of a multiplex modulation signal, in which the measurements of the phase difference and the lag time may be carried out in parallel with use of a single frequency. Particularly, a measuring time can be shortened as compared with that in an electro-optical distance meter time-divisionally using three frequencies.

5 Claims, 10 Drawing Sheets

DISTANCE MEASURING DEVICE

BACKGROUND OF THE INVENTION

The present invention relates to a distance measuring device using two kinds of frequencies, and more particularly to an electro-optical distance meter for measuring a distance to a reflecting mirror located at a measuring point by combining the results of fine measurement and rough measurement wherein the fine measurement is carried out by detecting a phase difference between a modulation signal generated from light emitting means and a reflected modulation signal reflected by the reflecting mirror and received by light receiving means, while the rough measurement is carried out by measuring a lag time between the modulation signal and the reflected modulation signal.

The present invention further relates to an electro-optical distance meter for measuring a distance by detecting a phase difference and a lag time of a multiplex modulation signal, and more particularly to a distance measuring device which can carry out the measurements of the phase difference and the lag time in parallel with use of a single frequency.

A conventional electro-optical distance meter is constructed of a body of the distance meter and a reflector. A modulation wave generated from the body is reflected by the reflector, and a reflected modulation wave from the reflector is received by the body. A phase difference between the modulation wave from the body and the reflected modulation wave from the reflector corresponds to a distance between the body and the reflector. Therefore, the distance between the body and the reflector can be calculated by detecting the phase difference.

In case of measuring a short distance, the reflector such as a reflecting mirror may not be specially provided, but an object located at a measuring point may be utilized as the reflector.

In general, the electro-optical distance meter requires a high accuracy of measurement, and it is therefore necessary to use a modulation wave having a relatively short wavelength for the measurement. For instance, in case of obtaining a measurement accuracy of about ±5 mm, it is necessary to use a modulation wave having a first wavelength $\lambda_1 = 20$ m for fine measurement. However, the relation between a distance to be measured and a phase of the modulation wave is such that the phase changes in the range of 0–2$\pi$ with a change in the distance of every 10 m (optical path length of 20 m) Accordingly, the distance of 10 m or less can only be measured (i.e., a measuring period is 10 m). To measure a distance more than 10 m, it is necessary to use a modulation wave having a second wavelength $\lambda_2$ larger than the first wavelength $\lambda_1$ for the fine measurement and thereby carry out rough measurement (approximate measurement). Further, to measure a longer distance, it is necessary to use a modulation wave having a third wavelength $\lambda_3$ larger than the second wavelength $\lambda_2$ for the rough measurement and thereby carry out very rough measurement.

The results of the fine measurement, the rough measurement and the very rough measurement are combined to obtain a final measurement result. That is, the distance measurement is carried out with use of three kinds of frequencies corresponding to the three kinds of wavelengths $\lambda_1$, $\lambda_2$ and $\lambda_3$.

However, as the conventional electro-optical distance meter uses three or more kinds of frequencies for the measurement, it is necessary to time-divisionally select the wavelengths, causing an increase in total measuring time. To shorten the total measuring time, it is necessary to shorten a partial measuring time corresponding to each measuring frequency, causing a reduction in the measurement accuracy.

Furthermore, the partial measuring times corresponding to the respective measuring frequencies are different from one another to result in a difference in turbulent influence by the atmosphere or the like. This difference causes an error in calculation of figure arrangement of each measuring wavelength.

In these circumstances, it has been greatly demanded to realize an electro-optical distance meter which can shorten the total measuring time without reducing the measurement accuracy.

DESCRIPTION OF THE INVENTION

Some preferred embodiments of the present invention will now be described with reference to the drawings.

First Preferred Embodiment

Figure 1:
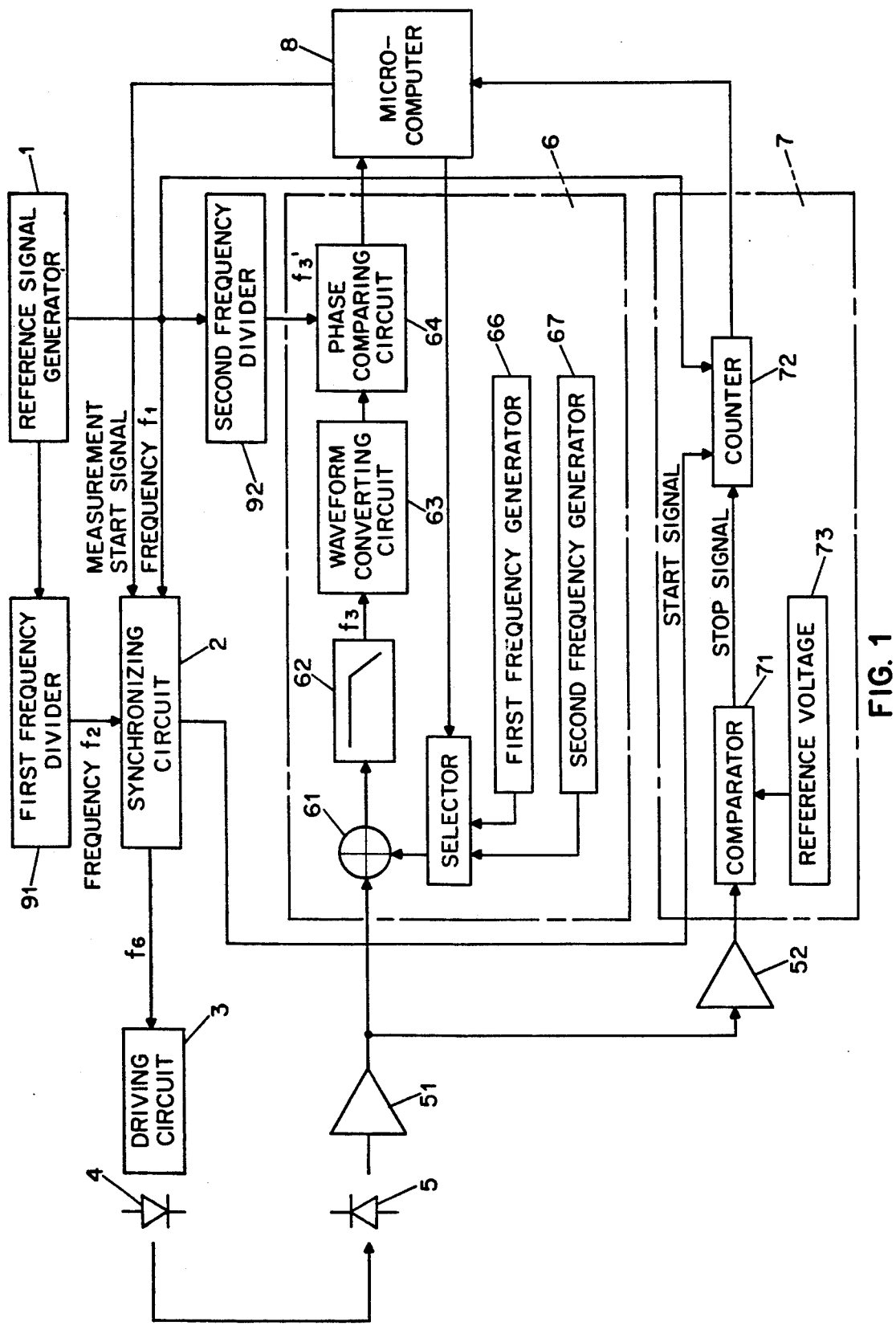
FIG. 1 is a block diagram illustrating the construction of a first preferred embodiment of the present invention.

Referring to FIG. 1 which shows a construction of an electro-optical distance meter according to a first preferred embodiment of the present invention, the electro-optical distance meter is comprised of a reference signal generator 1, synchronizing circuit 2, driving circuit 3, light emitting means 4, light receiving means 5, phase difference detecting means 6, lag time measuring means 7, microcomputer 8, first frequency divider 91, and second frequency divider 92.

The reference signal generator 1 corresponds to the signal generating means of the present invention, and it is provided to generate a modulation signal. The reference signal generator 1 can generate a signal having a frequency $f_1$, while it can supply a signal having a frequency $f_2$ through the first frequency divider 91 to the synchronizing circuit 2. The synchronizing circuit 2 is provided to generate a signal synchronized with the signal having the frequency $f_1$ or the signal having the frequency $f_2$ from the first frequency divider 91.

The driving circuit 3 is provided to drive the light emitting means 4, and it can drive the light emitting means 4 according to the synchronous signal from the synchronizing circuit 2. The light emitting means 4 is provided to generate a modulation light according to a driving signal received from the driving circuit 3. A laser diode is adopted as the light emitting means 4 in this preferred embodiment. The light receiving means 5 is a photoelectric conversion element for receiving a modulation light reflected by a reflecting mirror located at a measuring point. The reflecting mirror corresponds to the reflecting means of the present invention. A reflected modulation signal obtained by the light receiving means 5 is amplified by a first amplifier 51, and is then supplied to the phase difference detecting means 6 and the lag time measuring means 7.

The phase difference detecting means 6 is provided to detect a phase difference between the modulation signal generated from the light emitting means 4 and the reflected modulation signal generated from the light receiving means 5, thereby carrying out fine measurement. The phase difference detecting means 6 is comprised of a mixer 61, low-pass filter 62, waveform converting circuit 63, phase comparing circuit 64, selector 65, first frequency generator 66, and second frequency generator 67.

The lag time measuring means 7 is provided to measure a lag time between the modulation signal generated from the light emitting means 4 and the reflected modulation signal generated from the light receiving means 5, thereby carrying out rough measurement. The lag time measuring means 7 is comprised of a comparator 71, counter 72, and reference voltage generator 73.

The microcomputer 8 is provided to control the operation of each circuit and carry out computation of a distance or the like.

Figure 2:
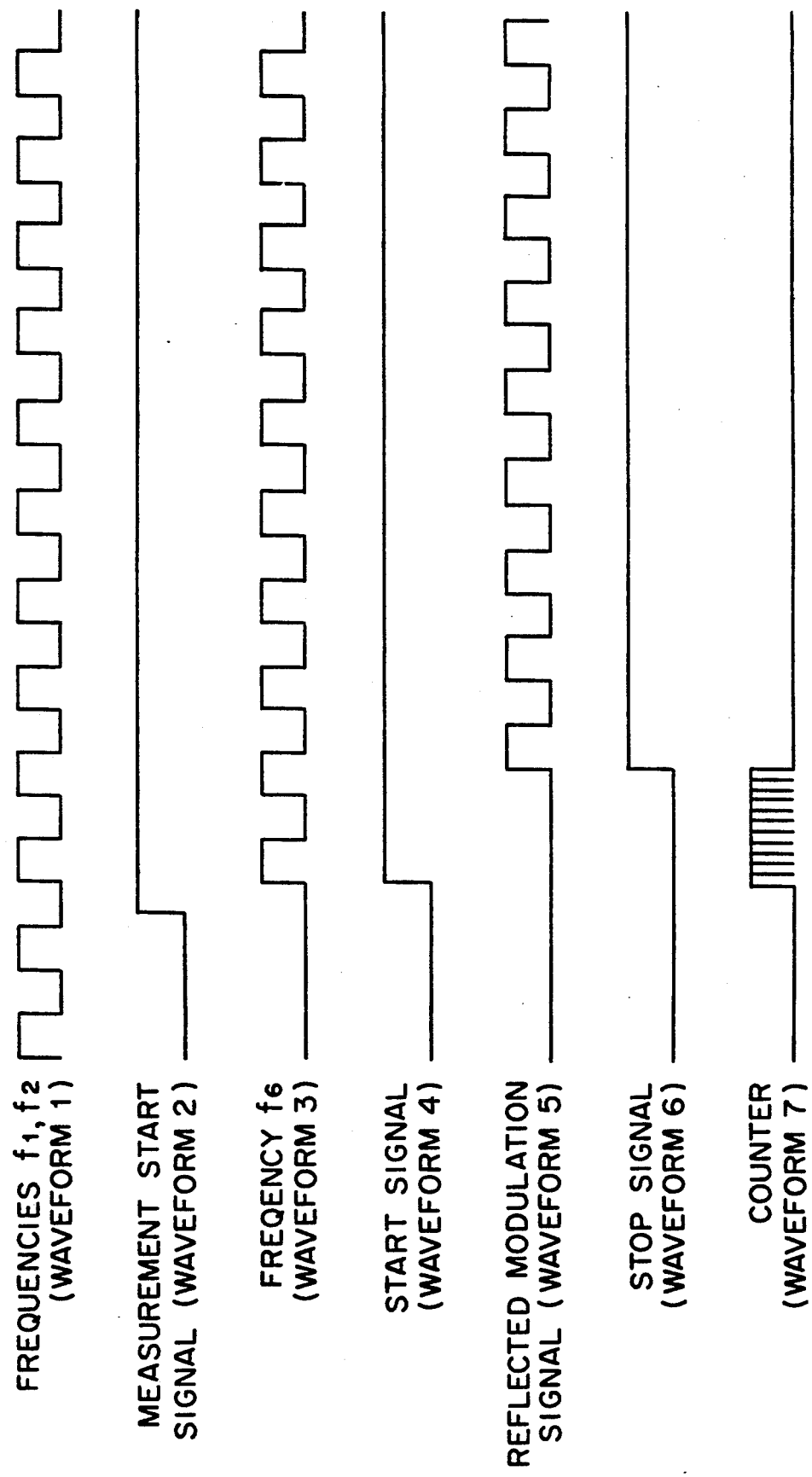
FIG. 2 is a waveform chart illustrating the operation of the first preferred embodiment.

The operation of the first preferred embodiment constructed above will now be described with reference to FIGS. 1 and 2.

First, the microcomputer 8 selects whether the frequency $f_1$ or the frequency $f_2$ is to be employed for measurement.

In the case of employing the frequency $f_1$, a signal (waveform 1) having the frequency $f_1$ is supplied from the reference signal generator 1 to the synchronizing circuit 2. When a measurement start signal (waveform 2) is output from the microcomputer 8 to the synchronizing circuit 2, a signal (waveform 3) synchronous with the signal having the frequency $f_1$ supplied from the reference signal generator 1 is supplied from the synchronizing circuit 2 to the driving circuit 3, and simultaneously a start signal (waveform 4) is supplied from the synchronizing circuit 2 to the counter 72 of the lag time measuring means 7.

The light emitting means 4 is driven by the driving circuit 3 according to the signal (waveform 3) input into the driving circuit 3 to generate a modulation light. The modulation light generated from the light emitting means 4 is reflected by the reflecting mirror located at the measuring point, and is received by the light receiving means 6. The light receiving means 5 carries out photoelectric conversion to form a reflected modulation signal. The reflected modulation signal is amplified by the first amplifier 51, and is then supplied to the phase difference detecting means 6. At the same time, the reflected modulation signal amplified by the first amplifier 51 is further amplified by a second amplifier 52, and is then supplied to the lag time measuring means 7.

The lag time measuring means 7 operates as follows:
The reflected modulation signal (waveform 5) amplified by the second amplifier 52 is input into the comparator 71. The comparator 71 compares the reflected modulation signal input thereinto with a reference voltage input from the reference voltage generating circuit 73, and outputs a stop signal (waveform 6) when the reflected modulation signal exceeds the reference voltage. The stop signal (waveform 6) from the comparator 71 and the start signal (waveform 4) from the synchronizing circuit 2 are input into the counter 72. The counter 72 counts the number of clocks (waveform 7) generated from the reference signal generator 1 and input during a lag time between the start signal and the stop signal. The microcomputer 8 can compute a distance between the reflecting mirror and the electro-optical distance meter according to the number of clocks counted above and the oscillation frequency of the reference signal generator 1.

For instance, assuming that the time lag between the start signal and the stop signal is 25 $\mu$s, and the oscillation frequency of the reference signal generator 1 is 15 MHz, the number of clocks counted by the counter 72 becomes "375". As the count number of one clock corresponds to the distance of 20 m, a double distance between the electro-optical distance meter and the reflecting mirror is represented as follows:

$$375 \times 20 \text{ m} = 7500 \text{ m}$$

Therefore, the distance between the electro-optical distance meter and the reflecting mirror is equal to 3750 m.

A similar result is obtained also in the case of employing the frequency $f_2$.

On the other hand, the phase difference detecting means 6 operates as follows:

The reflected modulation signal amplified by the first amplifier 51 is input into the mixer 61 to carry out frequency conversion. At this time, a signal corresponding to the frequency $f_1$ is supplied from the first frequency generator 66 through the selector 65 to the mixer 61. In the case of employing the frequency $f_2$ for measurement, the selector 65 is switched to supply a signal form the second frequency generator 67 to the mixer 61.

After carrying out the frequency conversion in the mixer 61, the reflected modulation signal is supplied to the low-pass filter 62, in which a predetermined frequency $f_3$ only is allowed to pass. Then, waveform shaping is carried out by the waveform converting circuit 63. On the other hand, the frequency of the signal generated from the reference signal generator 1 is divided by the second frequency divider 92 to generate a signal having a frequency $f_3'$ (same as the frequency $f_3$). Then, phase comparison is carried out between the frequency $f_3$ of the output signal from the waveform converting circuit 63 and the frequency $f_3'$ of the output signal from the second frequency divider 92. By utilizing this phase difference, the microcomputer 8 can compute the distance between the electro-optical distance meter and the reflecting mirror.

Although the frequency $f_1$ is employed for the measurement int he above description, the frequency $f_2$ may be employed to carry out the measurement. That is, the frequency of the output signal from the reference signal generator 1 is divided by the first frequency divider 91 to generate the frequency $f_2$, and the signal having the frequency $f_2$ is supplied to the synchronizing circuit 2. On the other hand, the selector 65 of the phase difference detecting means 6 is switched to connect the second frequency generator 67 to the mixer 61.

For instance, assuming that the frequency $f_1$ is 15 MHz, and the phase difference is 90 degrees in the case of employing the frequency $f_1$ for measurement, a reduced distance becomes 2.5 m since the phase difference of 360 degrees corresponds to the distance of 10 m. Similarly, assuming that the frequency $f_2$ is 150 kHz, and the phase difference is 271 degrees in the case of employing the frequency $f_2$ for measurement, a reduced distance becomes 753 m since the phase difference of 360 degrees corresponds to the distance of 1000 m.

Consequently, the microcomputer 8 synthesizes the three kinds of distances obtained from the phase difference detecting means 6 and the lag time measuring means 7 to compute an accurate distance to be measured. That is, the distance less than 10 m is computed from the phase difference detected by the phase difference detecting means 6 according to the frequency $f_1$; the distance of 10 m to 1000 m is computed from the phase difference detected by the phase difference detecting means 6 according to the frequency $f_2$; and the distance more than 1000 m is computed from the lag time measured by the lag time measuring means 7. Accordingly, the accurate distance under the above conditions becomes 3752.5 m.

According to the first preferred embodiment as described above, fine measurement is carried out by the phase difference detecting means 6 with use of the frequency $f_1$ and the frequency $f_2$, and rough measurement is carried out by the lag time measuring means 7. Thus, the measurement can be carried out with a high accuracy by employing two frequencies. Accordingly, it is greatly advantageous that a measuring time can be shortened as compared with that in the conventional electro-optical distance meter using three frequencies. It is readily appreciated that the values of the frequency $f_1$, the frequency $f_2$ and the oscillation frequency of the reference signal generator 1 are not limited to the above values mentioned in the first preferred embodiment, but they may be suitably selected.

Second Preferred Embodiment

Figure 3:
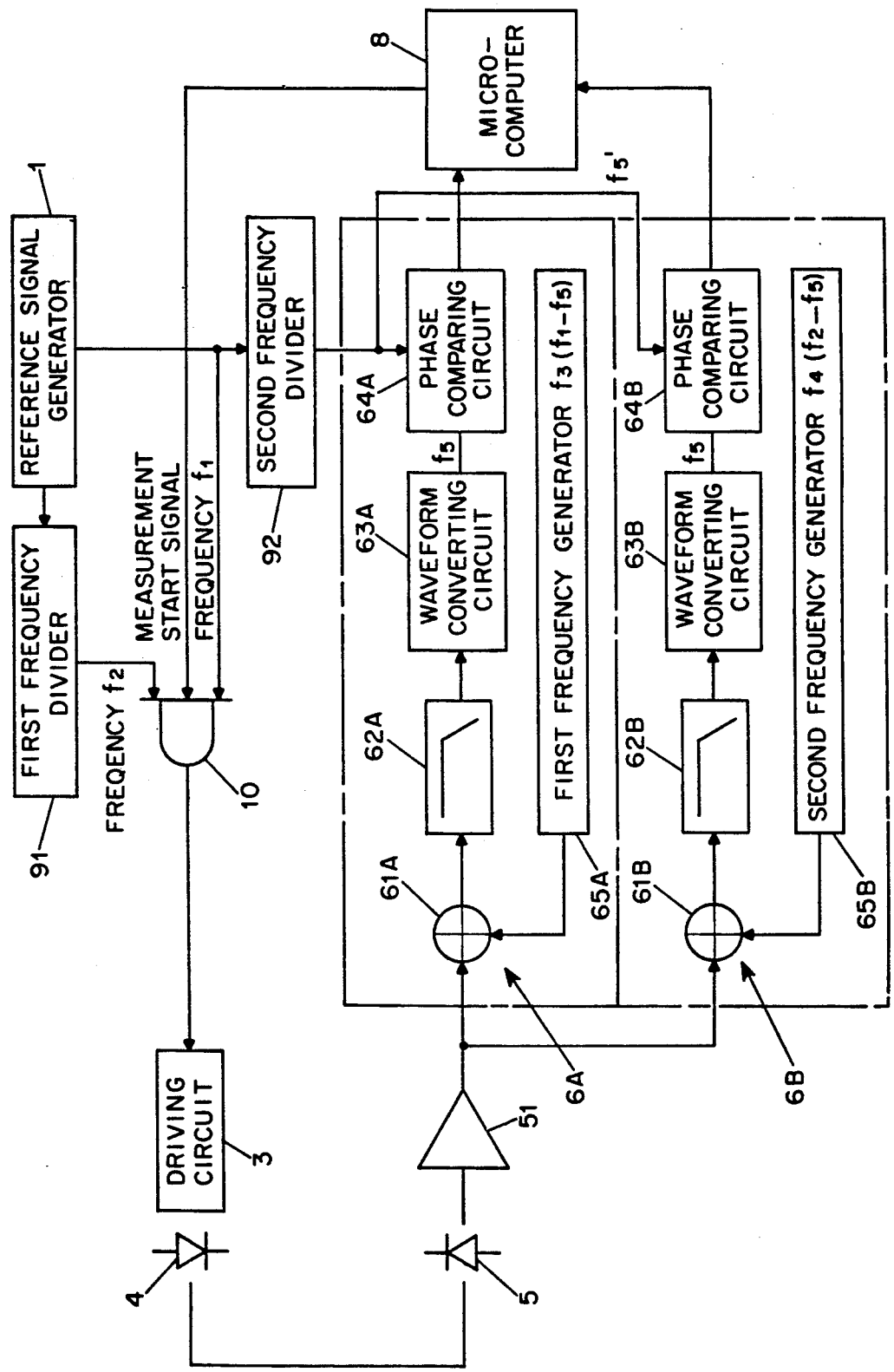
FIG. 3 is a block diagram illustrating the construction of a second preferred embodiment of the present invention.

Referring to FIG. 3 which shows a construction of an electro-optical distance meter according to a second preferred embodiment of the present invention, the electro-optical distance meter is comprised of a reference signal generator 1, driving circuit 3, light emitting means 4, light receiving means 5, first phase difference detecting means 6A, second phase difference detecting means 6B, microcomputer 8, first frequency divider 91, second frequency divider 92, and AND circuit 10.

The reference signal generator 1 corresponds to the signal generating means of the present invention, and it is provided to generate a modulation signal. The reference signal generator 1 can generate a signal having a frequency $f_1$, while it can supply a signal having a frequency $f_2$ through the first frequency divider 91 to the AND circuit 10.

The driving circuit 3 is provided to drive the light emitting means 4, and it can drive the light emitting means 4 according to a signal from the microcomputer 8. The light emitting means 4, which corresponds to the light emitting means of the present invention, is provided to generate a modulation light according to a driving signal received from the driving circuit 3. A laser diode is adopted as the light emitting means 4 in this preferred embodiment. The light receiving means 5, which corresponds to the light receiving means of the present invention, is a photoelectric conversion element for receiving a modulation light reflected by a reflecting mirror located at a measuring point. A reflected multiplex modulation signal obtained by the light receiving means 5 is amplified by an amplifier 51, and is then supplied to the first phase difference detecting means 6A and the second phase difference detecting means 6B.

The first and second phase difference detecting means 6A and 6B, which correspond to the phase difference detecting means of the present invention, are provided to detect a phase difference between the modulation signal generated from the light emitting means 4 and the reflected multiplex modulation signal generated from the light receiving means 5, thereby carrying out fine measurement.

The first phase difference detecting means 6A is comprised of a first mixer 61A, first low-pass filter 62A, first waveform converting circuit 63A, first phase comparing circuit 64A, and first frequency generator 65A. The first frequency generator 65A, which corresponds to the first local oscillator of the present invention, is provided to form a third period signal having a third frequency ($f_3$) slightly different from the first frequency ($f_1$). The first mixer 61A is provided to form a first synthetic signal by synthesizing the reflected multiplex modulation signal from the light receiving means 5 and the third period signal from the first frequency generator 65A. The first low-pass filter 62A is provided to extract a predetermined frequency component from the first synthetic signal. The first phase comparing circuit 64A is provided to obtain a phase difference between the first synthetic signal and a signal corresponding to the generated signal from the reference signal generator 1.

Similarly, the second phase difference detecting means 6B is comprised of a second mixer 61B, second low-pass filter 62B, second phase comparing circuit 64B, and second frequency generator 65B. The second frequency generator 65B, which corresponds to the second local oscillator of the present invention, is provided to form a fourth period signal having a fourth frequency ($f_4$) slightly different from the second frequency ($f_2$). The second mixer 61B is provided to form a second synthetic signal by synthesizing the reflected multiplex modulation signal from the light receiving means 5 and the fourth period signal from the second frequency generator 65B. The second low-pass filter 62B is provided to extract a predetermined frequency component from the second synthetic signal. The second phase comparing circuit 64B is provided to obtain a phase difference between the second synthetic signal and a signal corresponding to the generated signal from the reference signal generator 1.

The microcomputer 8 is provided to control the operation of each circuit and carry out computation of a distance or the like.

Figure 4:
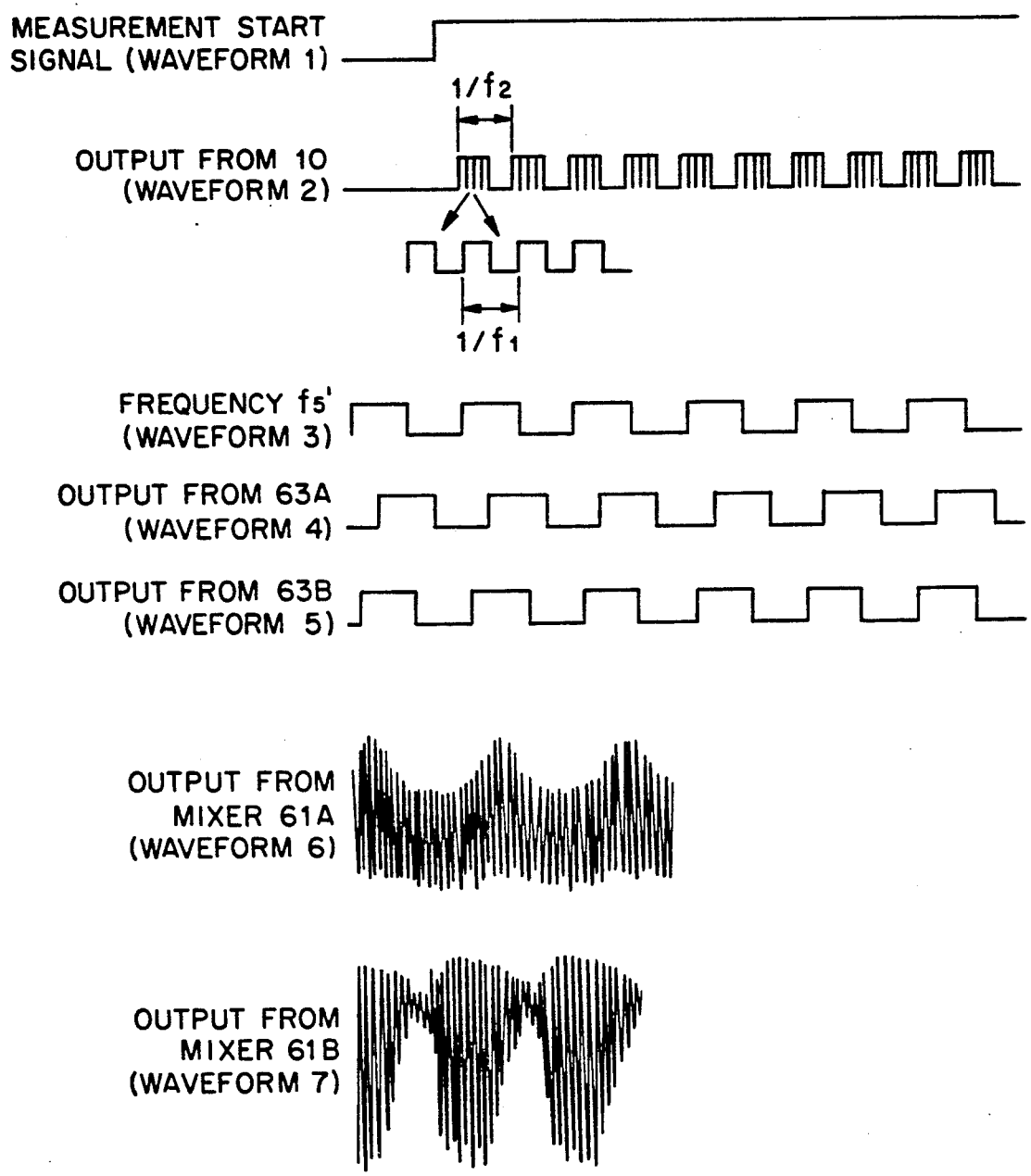
FIG. 4 is a waveform chart illustrating the operation of the second preferred embodiment.

The operation of the second preferred embodiment constructed above will now be described with reference to FIGS. 3 and 4.

A signal having a frequency $f_1$ is supplied from the reference signal generator 1 to the AND circuit 10. On the other hand, the frequency $f_1$ of the signal from the reference signal generator 1 is divided by the first frequency divider 91 to obtain a signal having a frequency $f_2$, which is in turn supplied to the AND circuit 10. Further, a measurement start signal (waveform 1) is adapted to be supplied from the microcomputer 8 to the AND circuit 10. Accordingly, when the measurement start signal (waveform 1) is output from the microcomputer 8 to the AND circuit 10, a multiplex amplitude modulation signal (waveform 2) is formed from the signal having the frequency $f_1$ generated from the reference signal generator and the signal having the frequency $f_2$ generated from the first frequency divider 91, and is output from the AND circuit 10 (amplitude shift keying system). The multiplex amplitude modulation signal is supplied to the driving circuit 3. The multiplex amplitude modulation signal corresponds to the multiplex modulation signal of the present invention. The driving circuit 3 drives the light emitting means 4 according to the multiplex amplitude modulation signal (waveform 2) input thereinto to generate a multiplex modulation light from the light emitting means 4. The light emitted from the light emitting means 4 is reflected by the reflecting mirror located at the measuring point, and is then received by the light receiving means 5. In the light receiving means 5, photoelectric conversion is carried out to form a reflected multiplex amplitude modulation signal. The reflected multiplex amplitude modulation signal is amplified by the amplifier 51, and is then supplied to the first and second phase difference detecting means 6A and 6B.

The first phase difference detecting means 6A operates as follows:

The first frequency generator 65A generates a signal having a frequency $f_3$ ($=f_1-f_5$) slightly different by a frequency $f_5$ from the frequency $f_1$. The signal having the frequency $f_3$ is supplied to the first mixer 61A, and it is mixed with the reflected multiplex amplitude modulation signal amplified by the amplifier 51 to carry out frequency conversion. The components of an output signal (waveform 6) from the first mixer 61A are as follows:

| $f_1$ | $f_2$ | $f_5$ |
|---|---|---|
| $f_1 + f_2$ | $f_1 - f_2$ | $f_1 - f_5$ |
| $f_2 + f_5$ | $f_2 - f_5$ | $2f_1 - f_5$ |
| $f_1 + f_2 - f_5$ | $f_1 - f_2 - f_5$ | $2f_1 - f_2 - f_5$ |
| $2f_1 + f_2 - f_5$ | | |

The output signal from the first mixer 61A is supplied to the first low-pass filter 62A, in which a signal having the predetermined frequency $f_5$ only is allowed to pass. The signal having passed through the first low-pass filter 62A is shaped in waveform by the first waveform converting circuit 63A (waveform 4).

On the other hand, the signal having the frequency $f_1$ generated from the reference signal generator 1 is divided in frequency by the second frequency divider 92 to obtain a signal having a frequency $f_5'$ (same as the frequency $f_5$) (waveform 3). The signal having the frequency $f_5'$ is compared in phase with the signal having the frequency $f_5$ as an output signal from the first waveform converting circuit 63A by the first phase comparing circuit 64A.

Similarly, the second phase difference detecting means 6B operates as follows:

The second frequency generator 65B generates a signal having a frequency $f_4$ ($=f_2-f_5$) slightly different by a frequency $f_5$ from the frequency $f_2$. The signal having the frequency $f_4$ is supplied to the second mixer 61B, and it is mixed with the reflected multiplex amplitude modulation signal amplified by the amplifier 51 to carry out frequency conversion. The components of an output signal (waveform 7) from the second mixer 61B are as follows:

| $f_1$ | $f_2$ | $f_5$ |
|---|---|---|
| $f_1 + f_2$ | $f_2 - f_5$ | $f_1 + f_5$ |
| $f_1 - f_5$ | $f_1 - f_2$ | $2f_2 - f_5$ |
| $f_1 + f_2 - f_5$ | $f_1 - f_2 + f_5$ | $f_1 + 2f_2 - f_5$ |
| $f_1 - 2f_2 + f_5$ | | |

The output signal from the second mixer 61B is supplied to the second low-pass filter 62B, in which a signal having the predetermined frequency $f_5$ only is allowed to pass. The signal having passed through the second low-pass filter 62B is shaped in waveform by the second waveform converting circuit 63B (waveform 5).

On the other hand, the signal having the frequency $f_5'$ output from the second frequency divider 92 is compared in phase with the signal having the frequency $f_5$ as an output signal from the second waveform converting circuit 63B by the second phase comparing circuit 64B.

By utilizing the phase differences obtained by the first and second phase comparing circuits 64A and 64B, the microcomputer 8 can compute the distance between the electro-optical distance meter and the reflecting mirror. Thus, the first and second phase comparing circuits 64A and 64B and the microcomputer 8 correspond to the distance measuring means of the present invention.

The above phase comparing operations by the first and second phase comparing circuits 64A and 64B are simultaneously carried out.

A typical example of distance measurement will now be described. For instance, assuming that the frequency $f_1$ is 15 MHz, and the phase difference measured by the first phase difference detecting means 6A is 90 degrees, a reduced distance in the case of using the first phase difference detecting means 6A becomes 2.5 m since the phase difference of 360 degrees corresponds to the distance of 10 m. Similarly, assuming that the frequency $f_2$ is 150 kHz, and the phase difference measured by the second phase difference detecting means 6B is 271 degrees, a reduced distance in the case of using the second phase difference detecting means 6B becomes 753 m since the phase difference of 360 degrees corresponds to the distance of 1000 m.

Consequently, the microcomputer 8 synthesizes the two kinds of distances obtained from the first and second phase difference detecting means 6A and 6B to compute an accurate distance to be measured. That is, the distance less than 10 m is computed from the phase difference detected by the first phase difference detecting means 6A (employing the first frequency $f_1$), and the distance of 10 m to 1000 m is computed from the phase difference detected by the second phase difference detecting means 6B (employing the frequency $f_2$). Accordingly, the accurate distance under the above conditions becomes 752.5 m.

According to the second preferred embodiment as described above, fine measurement is carried out by the first and second phase difference detecting means 6A and 6B with use of the multiplex amplitude modulation signal of the frequency $f_1$ and the frequency $f_2$. Thus, the measurement can be carried out with a high accuracy by employing a single frequency. Accordingly, it is greatly advantageous that a measuring time can be shortened as compared with that in the conventional electro-optical distance meter using three frequencies. In particular, this preferred embodiment is greatly effective in a high-speed measuring mode (tracking measurement) in a distance meter requiring a wide measuring range in a short time.

It is readily appreciated that the values of the frequency $f_1$, the frequency $f_2$ and the oscillation frequency of the reference signal generator 1 are not limited to the above values mentioned in the second preferred embodiment, but they may be suitably selected.

Third Preferred Embodiment

A third preferred embodiment of the present invention will now be described with reference to FIGS. 5 and 6.

Figure 5:
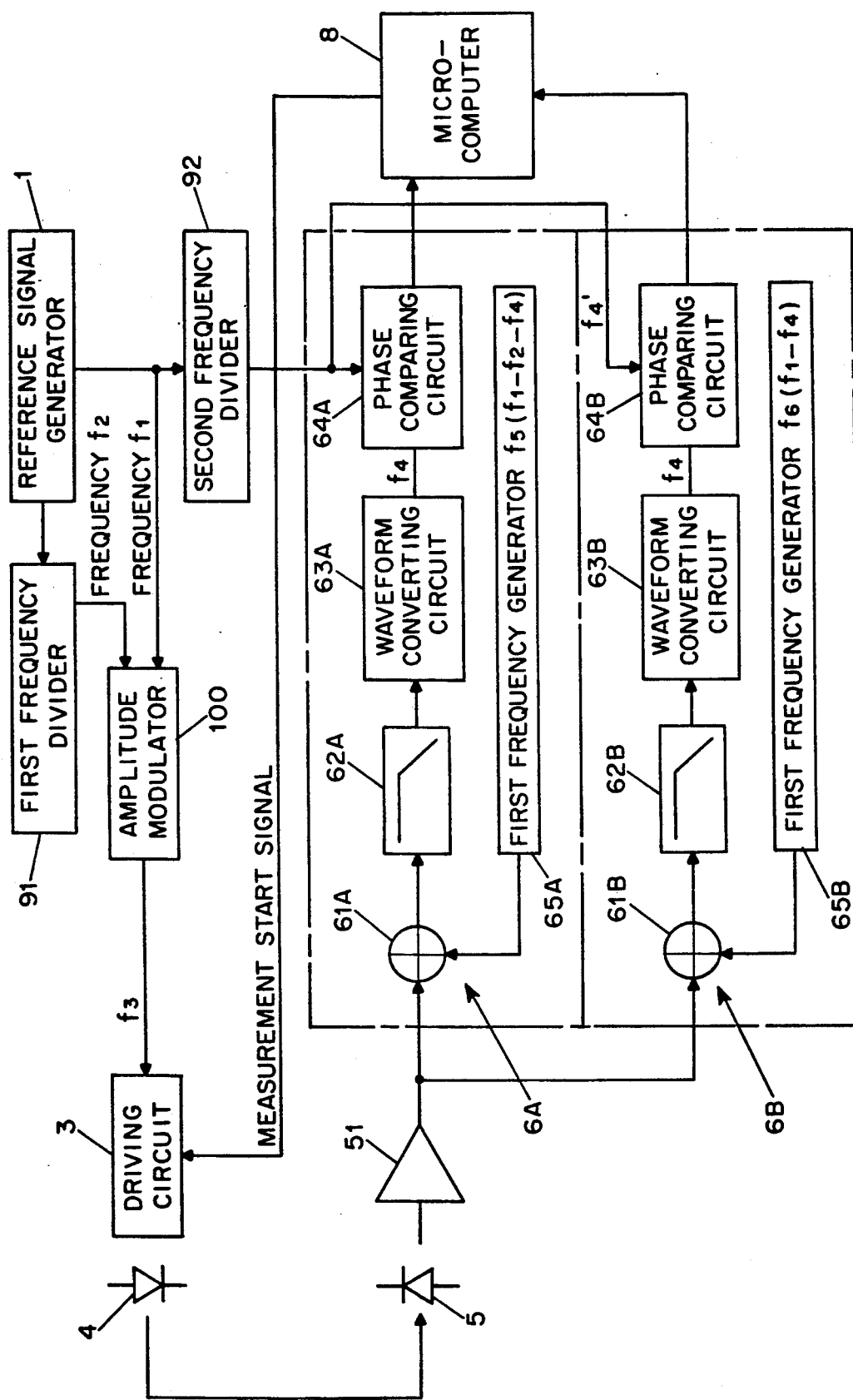
FIG. 5 is a block diagram illustrating the construction of a third preferred embodiment of the present invention.
Figure 6:
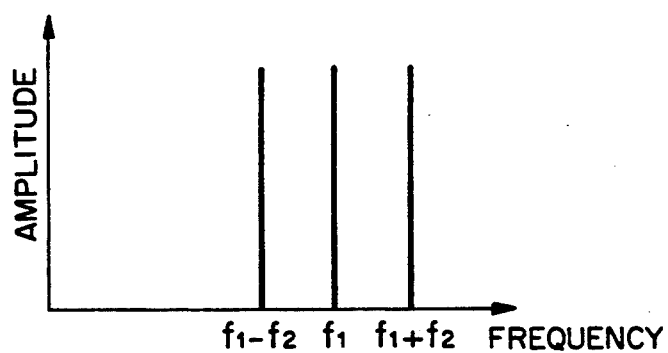
FIG. 6 is a graph illustrating an amplitude spectrum in the third preferred embodiment.

Referring to FIG. 5 which shows a construction of an electro-optical distance meter according to the third preferred embodiment of the present invention, the electro-optical distance meter is comprised of a reference signal generator 1, driving circuit 3, light emitting means 4, light receiving means 5, first phase difference detecting means 6A, second phase difference detecting means 6B, microcomputer 8, first frequency divider 91, second frequency divider 92, and amplitude modulator 100.

The construction of the third preferred embodiment is basically similar to that of the second preferred embodiment with the exception that amplitude modulator 100 is substituted for the AND circuit 10 employed in the second preferred embodiment and that the measurement start signal is supplied directly to the driving circuit 3. The explanation of the other construction will accordingly be omitted hereinafter.

In the third preferred embodiment, amplitude modulation is carried out by the amplitude modulator 100 with use of a signal having a frequency $f_1$ supplied from the reference signal generator 1 as a carrier wave and a signal having a frequency $f_2$ supplied from the first frequency divider 91 as a modulation wave. That is, the amplitude of the signal having the frequency $f_1$ is modulated by the signal having the frequency $f_2$. Accordingly, as shown in FIG. 6, an amplitude spectrum of a modulation signal is constituted of three carrier waves having the frequencies $f_1$, $f_1-f_2$, and $f_1 + f_2$.

When the measurement start signal is output from the microcomputer 8 to the driving circuit 3, the light emitting means 4 is driven by the driving circuit 3 according to a multiplex amplitude modulation signal to generate a multiplex modulation light. The light emitted from the light emitting means 4 is reflected by the reflecting mirror located at the measuring point, and is then received by the light receiving means 5. In the light receiving means 5, photoelectric conversion is carried out to form a reflected multiplex amplitude modulation signal. The reflected multiplex amplitude modulation signal is amplified by the amplifier 51, and is then supplied to the first and second phase difference detecting means 6A and 6B.

The first phase difference detecting means 6A operates as follows:

The first frequency generator 65A generates a signal having a frequency $f_5 (=f_1-f_2-f_4)$ slightly different by a frequency $f_4$ from the frequency $(f_1-f_2)$. The signal having the frequency $f_5$ is supplied to the first mixer 61A, and it is mixed with the reflected multiplex amplitude modulation signal amplified by the amplifier 51 to carry out frequency conversion.

The output signal from the first mixer 61A is supplied to the first low-pass filter 62A, in which a signal having the predetermined frequency $f_4$ only is allowed to pass. The signal having passed through the first low-pass filter 62A is shaped in waveform by the first waveform converting circuit 63A.

On the other hand, the signal having the frequency $f_1$ generated from the reference signal generator 1 is divided in frequency by the second frequency divider 92 to obtain a signal having a frequency $f_4'$ (same as the frequency $f_4$). The signal having the frequency $f_4'$ is compared in phase with the signal having the frequency $f_4$ as an output signal from the first waveform converting circuit 63A by the first phase comparing circuit 64A.

Similarly, the second phase difference detecting means 6B operates as follows:

The second frequency generator 65B generates a signal having a frequency $f_6 (=f_1-f_4)$ slightly different by a frequency $f_4$ from the frequency $f_1$. The signal having the frequency $f_6$ is supplied to the second mixer 61B, and it is mixed with the reflected multiplex amplitude modulation signal amplified by the amplifier 51 to carry out frequency conversion.

The output signal from the second mixer 61B is supplied to the second low-pass filter 62B, in which a signal having the predetermined frequency $f_4$ only is allowed to pass. The signal having passed through the second low-pass filter 62B is shaped in waveform by the second waveform converting circuit 63B.

On the other hand, the signal having the frequency $f_4'$ output from the second frequency divider 92 is compared in phase with the signal having the frequency $f_4$ as an output signal from the second waveform converting circuit 63B by the second phase comparing circuit 64B.

By utilizing the phase differences obtained by the first and second phase comparing circuits 64A and 64B, the microcomputer 8 can compute the distance between the electro-optical distance meter and the reflecting mirror.

The above phase comparing operations by the first and second phase comparing circuits 64A and 64B are simultaneously carried out.

A typical example of distance measurement will now be described. For instance, it is assumed that the frequency $f_1$ is 15 MHz; the frequency $f_2$ is 150 kHz; the phase difference measured by the first phase difference detecting means 6A is 196.9 degrees; and the phase difference measured by the second phase difference detecting means 6B is 108 degrees. Under these conditions, a reduced distance in the case of using the first phase difference detecting means 6A becomes 5.525 m since the phase difference of 360 degrees corresponds to the distance of 10.101010 m. Similarly, a reduced distance in the case of using the second phase difference detecting means 6B becomes 3.000 m since the phase difference of 360 degrees corresponds to the distance of 10 m. Furthermore, the distance more than 10 m is computed from the difference between the frequencies $f_1$ and $f_2$ by the microcomputer 8, and consequently, the distance between the electro-optical distance meter and the reflecting mirror is displayed as 753.000 m.

Fourth Preferred Embodiment

Figure 8:
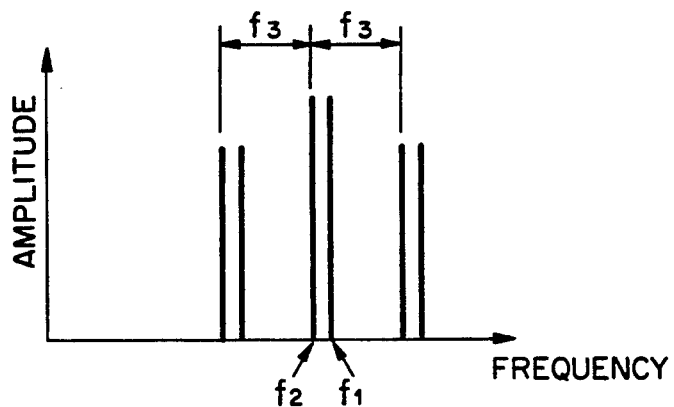
FIG. 8 is a graph illustrating an amplitude spectrum in the fourth preferred embodiment.

A fourth preferred embodiment of the present invention will now be described with reference to FIGS. 7 and 8.

Figure 7:
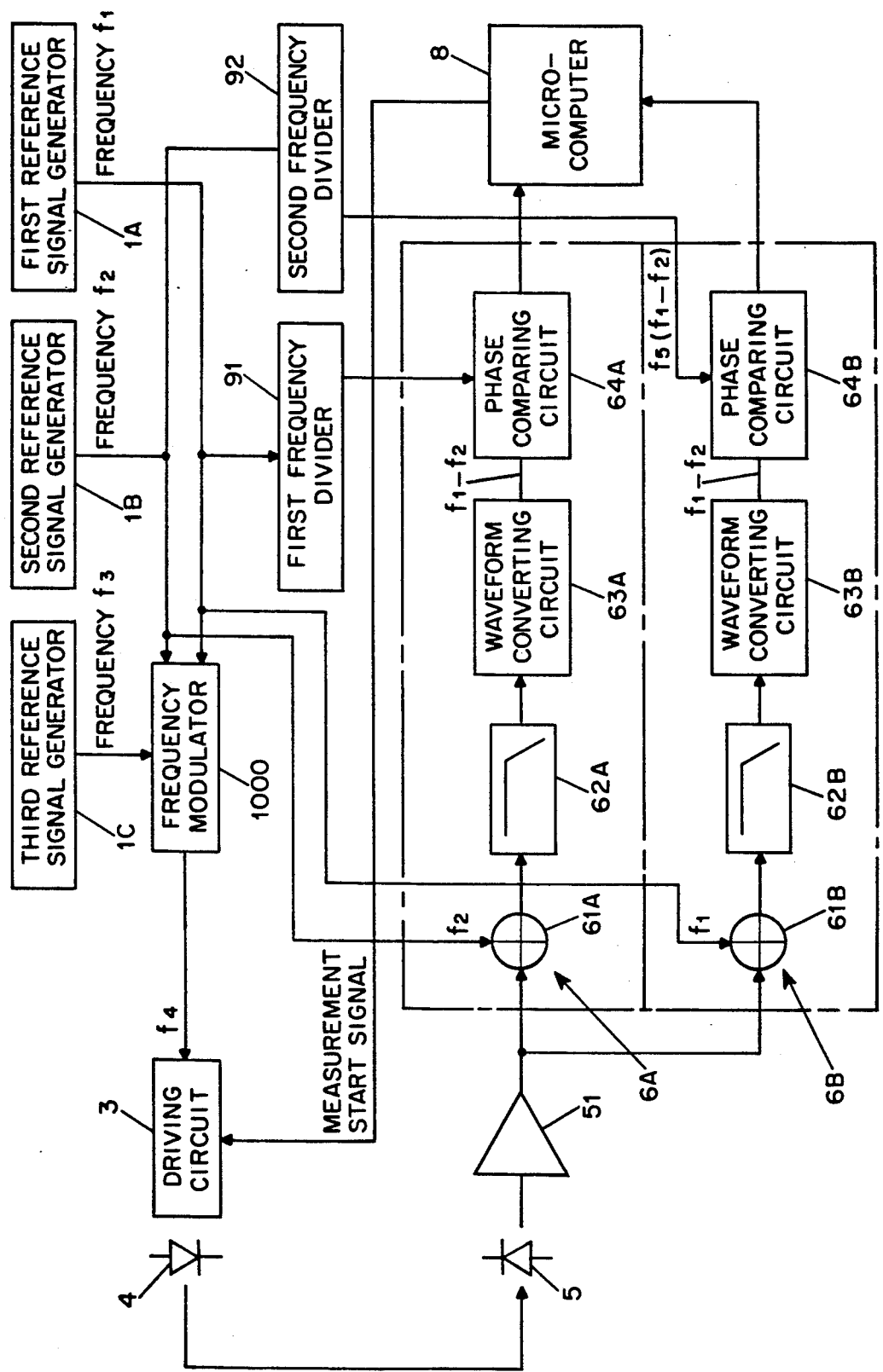
FIG. 7 is a block diagram illustrating the construction of a fourth preferred embodiment of the present invention.

Referring to FIG. 7 which shows a construction of an electro-optical distance meter according to the fourth preferred embodiment of the present invention, the electro-optical distance meter is comprised of a first reference signal generator 1A, second reference signal generator 1B, third reference signal generator 1C, driving circuit 3, light emitting means 4, light receiving means 5, first phase difference detecting means 6A, second phase difference detecting means 6B, microcomputer 8, first frequency divider 91, second frequency divider 92, and frequency modulator 1000.

The first, second and third reference signal generators 1A, 1B and 1C correspond to the signal generating means of the present invention. The first reference signal generator 1A can generate a signal having a frequency $f_1$; the second reference signal generator 1B can generate a signal having a frequency $f_2$; and the third reference signal generator 1C can generate a signal having a frequency $f_3$.

The signal having the frequency $f_1$ from the first reference signal generator 1A is supplied to the frequency modulator 1000, and the signal having the frequency $f_2$ from the second reference signal generator 1B is also supplied to the frequency modulator 1000. The frequency modulator 1000 receives the signal having the frequency $f_1$ and the signal having the frequency $f_2$ according to the period of the signal having the frequency $f_3$. Accordingly, multiplex modulation is effected by frequency modulation. As shown in FIG. 8, an amplitude spectrum of a modulation signal is constituted of a side band of carrier waves having reference frequencies $f_1$ and $f_2$ and adjacent frequencies spaced therefrom by the frequency $f_3$.

When the measurement start signal is output from the microcomputer 8 to the driving circuit 3, the light emitting means 4 is driven by the driving circuit 3 according to a multiplex frequency modulation signal to generate a multiplex modulation light. The light emitted from the light emitting means 4 is reflected by the reflecting mirror located at the measuring point, and is then received by the light receiving means 5. In the light receiving means 4, photoelectric conversion is carried out to form a reflected multiplex frequency modulation signal. The reflected multiplex frequency modulations signal is amplified by the amplifier 51, and is then supplied to the first and second phase difference detecting means 6A and 6B.

The first and second phase difference detecting means 6A and 6B, which correspond to the phase difference measuring means of the present invention, are provided to detect a phase difference between the modulation light generated from the light emitting means 4 and the reflected multiplex frequency modulation signal generated form the light receiving means 5, thereby carrying out distance measurement.

The first phase difference detecting means 6A is comprised of a first mixer 61A, first low-pass filter 62A, first waveform converting circuit 63A, and first phase comparing circuit 64A. While the first phase difference detecting means 6A in the fourth preferred embodiment does not include any frequency generator as 65A employed in the third preferred embodiment, the signal having the frequency $f_2$ from the second reference signal generator 1B is supplied to the first mixer 61A. Accordingly, the second reference signal generator 1B in the fourth preferred embodiment corresponds to the first local oscillator of the present invention.

Similarly, the second phase difference detecting means 6B is comprised of a second mixer 61B, second Low-pass filter 62B, second waveform converting circuit 63B, and second phase comparing circuit 64B. While the second phase difference detecting means 6B in the fourth preferred embodiment does not include any frequency generator employed in the third preferred embodiment, the signal having the frequency $f_1$ form the first reference signal generator 1A is supplied to the second mixer 61B. Accordingly, the first reference signal generator 1A in the fourth preferred embodiment corresponds to the second local oscillator of the present invention.

The operation of the first and second phase difference detecting means 6A and 6B will now be described. As mentioned above, the multiplex frequency modulation signal amplified by the amplifier 51 is supplied to both the first and second phase difference detecting means 6A and 6B.

The first phase difference detecting means 6A operates as follows:

The signal having the frequency $f_2$ from the second reference signal generator 1B is supplied to the first mixer 61A, and it is mixed with the reflected multiplex frequency modulation signal amplified by the amplifier 51 to carry out frequency conversion. The components of an output signal form the first mixer 61A are as follows:

| | | |
|---|---|---|
| $f_1$ | $f_2$ | $f_1 - f_2$ |
| $f_1 + f_2$ | $2f_2$ | |

The output signal from the first mixer 61A is supplied to the first low-pass filter 62A, in which a signal having the predetermined frequency $(f_1 - f_2)$ only is allowed to pass. The signal having passed through the first low-pass filter 62A is shaped in waveform by the first waveform converting circuit 63A to obtain a signal having the frequency $(f_1 - f_2)$.

On the other hand, the signal having the frequency $f_1$ generated from the first reference signal generator 1A is divided in frequency by the first frequency divider 91 to obtain a signal having a frequency $f_5'$ $(= f_1 - f_2)$. the signal having the frequency $f_5'$ is compared in phase with the signal having the frequency $(f_1 - f_2)$ as an output signal from the first waveform converting circuit 63A by the first phase comparing circuit 64A.

Similarly, the second phase difference detecting means 6B operates as follows:

The signal having the frequency $f_1$ from the first reference signal generator 1A is supplied to the second mixer 61B, and it is mixed with the reflected multiplex frequency modulation signal amplified by the amplifier 51 to carry out frequency conversion. The components of an output signal form the second mixer 61B are as follows:

| | | |
|---|---|---|
| $f_1$ | $f_2$ | $f_1 - f_2$ |
| $f_1 + f_2$ | $2f_1$ | |

The output signal for the second mixer 61B is supplied to the second low-pass filter 62B, in which a signal having the predetermined frequency $(f_1-f_2)$ only is allowed to pass. The signal having passed through the second low-pass filter 62B is shaped in waveform by the second waveform converting circuit 63B to obtain a signal having the frequency $(f_1-f_2)$.

On the other hand, the signal having the frequency $f_1$ generated from the first reference signal generator 1A is divided in frequency by the second frequency divider 92 to obtain a signal having a frequency $f_5'$ $(=f_1-f_2)$. The, the signal having the frequency $f_5'$ output form the second frequency divider 92 is compared in phase with the signal having the frequency $(=f_1-f_2)$ as an output signal form the second waveform converting circuit 63B by the second phase comparing circuit 64B.

By utilizing the phase differences obtained by the first and second phase comparing circuits 64A and 64B, the microcomputer 8 can compute the distance between the electro-optical distance meter and the reflecting mirror.

The above phase comparing operations by the first and second phase comparing circuits 64A and 64B are simultaneously carried out.

A typical example of distance measurement will now be described. For instance, it is assumed that the frequency $f_1$ is 15 MHz; the frequency $f_2$ is 15 MHz–150 kHz; the phase difference measured by the first phase difference detecting means 6A is 108 degrees; and the phase difference measured by the second phase difference detecting means 6B is (360–196.9) degrees. Under these conditions, a reduced distance in the case of using the first phase difference detecting means 6A becomes 3.000 m since the phase difference of 360 degrees corresponds to the distance of 10 m. Similarly, a reduced distance in the case of using the second phase difference detecting means 6B becomes 5.525 m since the phase difference of 360 degrees corresponds to the distance of 10.101010 m. Furthermore, the distance more than 10 m is computed from the difference between the frequencies $f_1$ and $f_2$ by the microcomputer 8, and consequently, the distance between the electro-optical distance meter and the reflecting mirror is displayed as 753.000 m.

Fifth Preferred Embodiment

Figure 10:
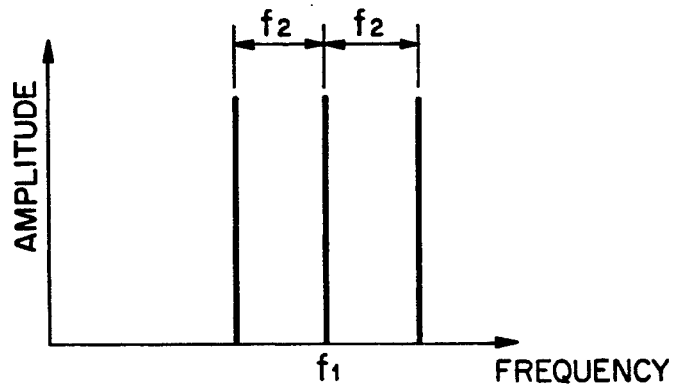
FIG. 10 is a graph illustrating an amplitude spectrum in the fifth preferred embodiment.

A fifth preferred embodiment of the present invention will now be described with reference to FIGS. 9 and 10.

Figure 9:
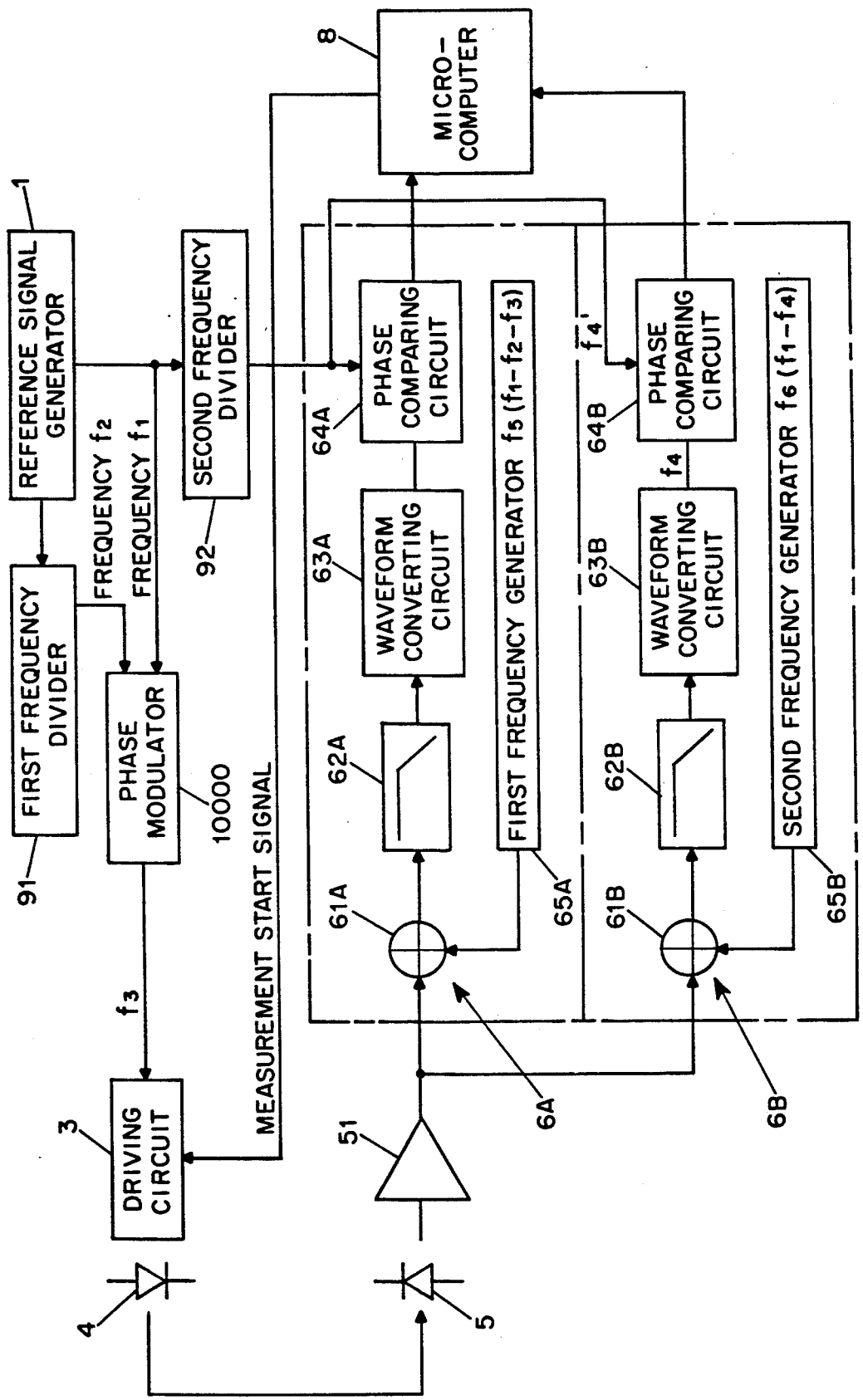
FIG. 9 is a block diagram illustrating the construction of a fifth preferred embodiment of the present invention.

Referring to FIG. 9 which shows a construction of an electro-optical distance meter according to the fifth preferred embodiment of the present invention, the electro-optical distance meter is comprised of a reference signal generator 1, driving circuit 3, light emitting means 4, light receiving means 5, first phase difference detecting means 6A, second phase difference detecting means 6B, microcomputer 8, first frequency divider 91, second frequency divider 92, and phase modulator 10000.

The construction of the fifth preferred embodiment is basically similar to that of the third preferred embodiment with the exception that phase modulator 10000 is substituted for the amplitude modulator 100 employed in the third preferred embodiment. The explanation of the other construction will accordingly be omitted hereinafter.

In the fifth preferred embodiment, phase modulation is carried out by the phase modulator 10000 with use of a signal having a frequency $f_1$ supplied from the reference signal generator 1 as a carrier wave and a signal having a frequency $f_2$ supplied from the first frequency divider 91 as a modulation wave. That is, the phase of the signal having the frequency $f_1$ is modulated by the signal having the frequency $f_2$. Accordingly, as shown in FIG. 9, an amplitude spectrum of a modulation signal is constituted of a carrier wave $f_1$ and a side wave of frequency interval $f_2$ having the frequencies $f_1-f_2$, and $f_1+f_2$.

When the measurement start signal is output from the microcomputer 8 to the driving circuit 3, the light emitting means 4 is driven by the driving circuit 3 according to a multiplex phase modulation signal to generate a multiplex phase modulation light. The light emitted from the light emitting means 4 is reflected by the reflecting mirror located at the measuring point, and is then received by the light receiving means 5. In the light receiving means 5, photoelectric conversion is carried out to form a reflected multiplex phase modulation signal. The reflected multiplex phase modulation signal is amplified by the amplifier 51, and is then supplied to the first and second phase difference detecting means 6A and 6B.

The first phase difference detecting means 6A operates as follows:

The first frequency generator 65A generates a signal having a frequency $f_5(=f_1-f_2-f_4)$ slightly different by a frequency $f_4$ from the frequency $(f_1-f_2)$. The signal having the frequency $f_5$ is supplied to the first mixer 61A, and it is mixed with the reflected multiplex phase modulation signal amplified by the amplifier 51 to carry out frequency conversion.

The other operation is the same as that in the third preferred embodiment with the exception that the phase modulation is substituted for the amplitude modulation employed in the third preferred embodiment.

A typical example of distance measurement will now be described. For instance, it is assumed that the frequency $f_1$ is 15 MHz; the frequency $f_2$ is 150 kHz; the phase difference measured by the first phase difference detecting means 6A is 196.9 degrees; and the phase difference measured by the second phase difference detecting means 6B is 108 degrees. Under these conditions, a reduced distance in the case of using the first phase difference detecting means 6A becomes 5.525 m since the phase difference of 360 degrees corresponds to the distance of 10.101010 m. Similarly, a reduced distance in the case of using the second phase difference detecting means 6B becomes 3.000 m since the phase difference of 360 degrees corresponds to the distance of 10 m. Furthermore, the distance more than 10 m is computed from the difference between the frequencies $f_1$ and $f_2$ by the microcomputer 8, and consequently, the distance between the electro-optical distance meter and the reflecting mirror is displayed as 753.000 m.

Sixth Preferred Embodiment

A sixth preferred embodiment of the present invention will now be described with reference to FIGS. 11 and 12.

Figure 11:
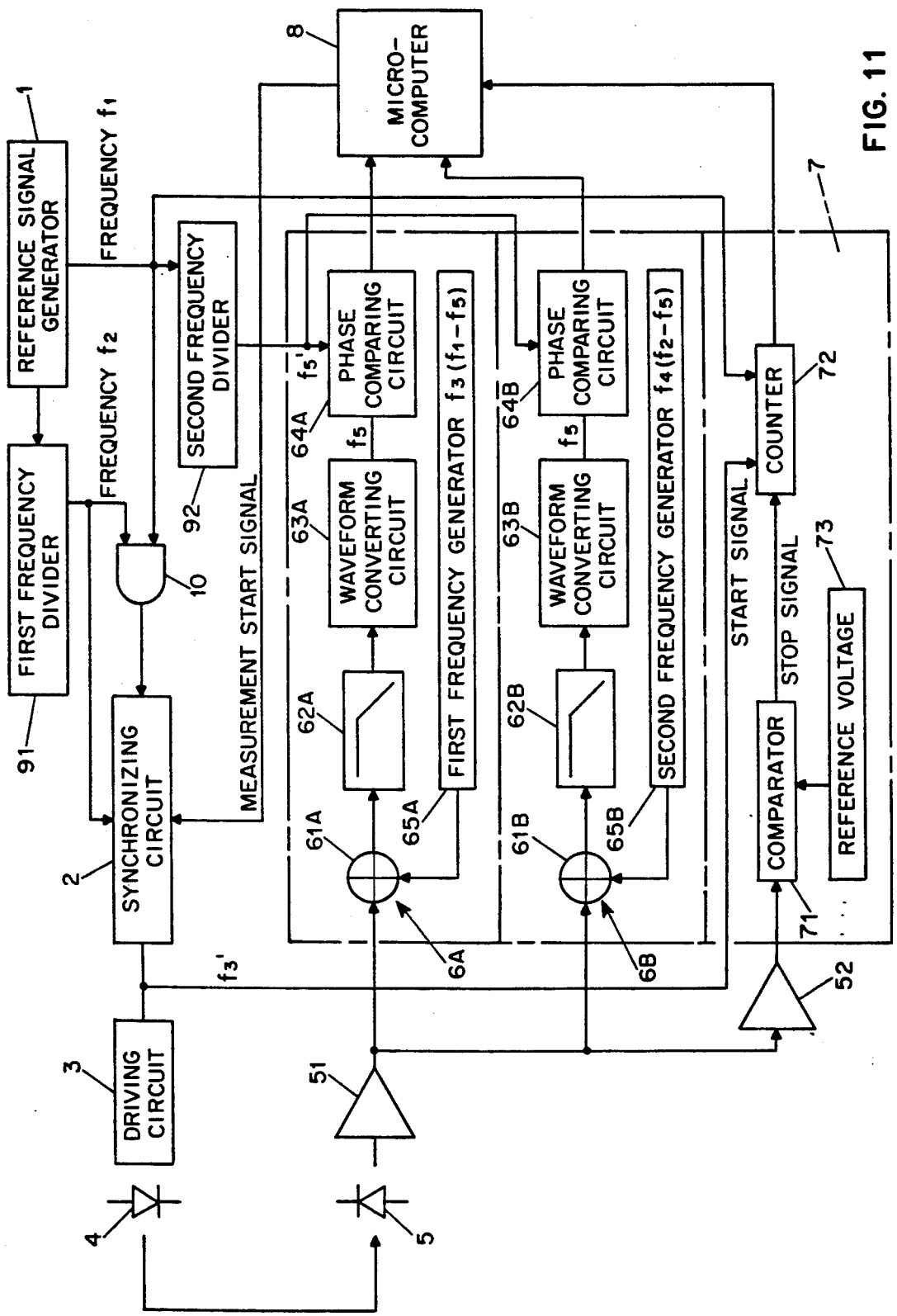
FIG. 11 is a block diagram illustrating the construction of a sixth preferred embodiment of the present invention.
Figure 12:
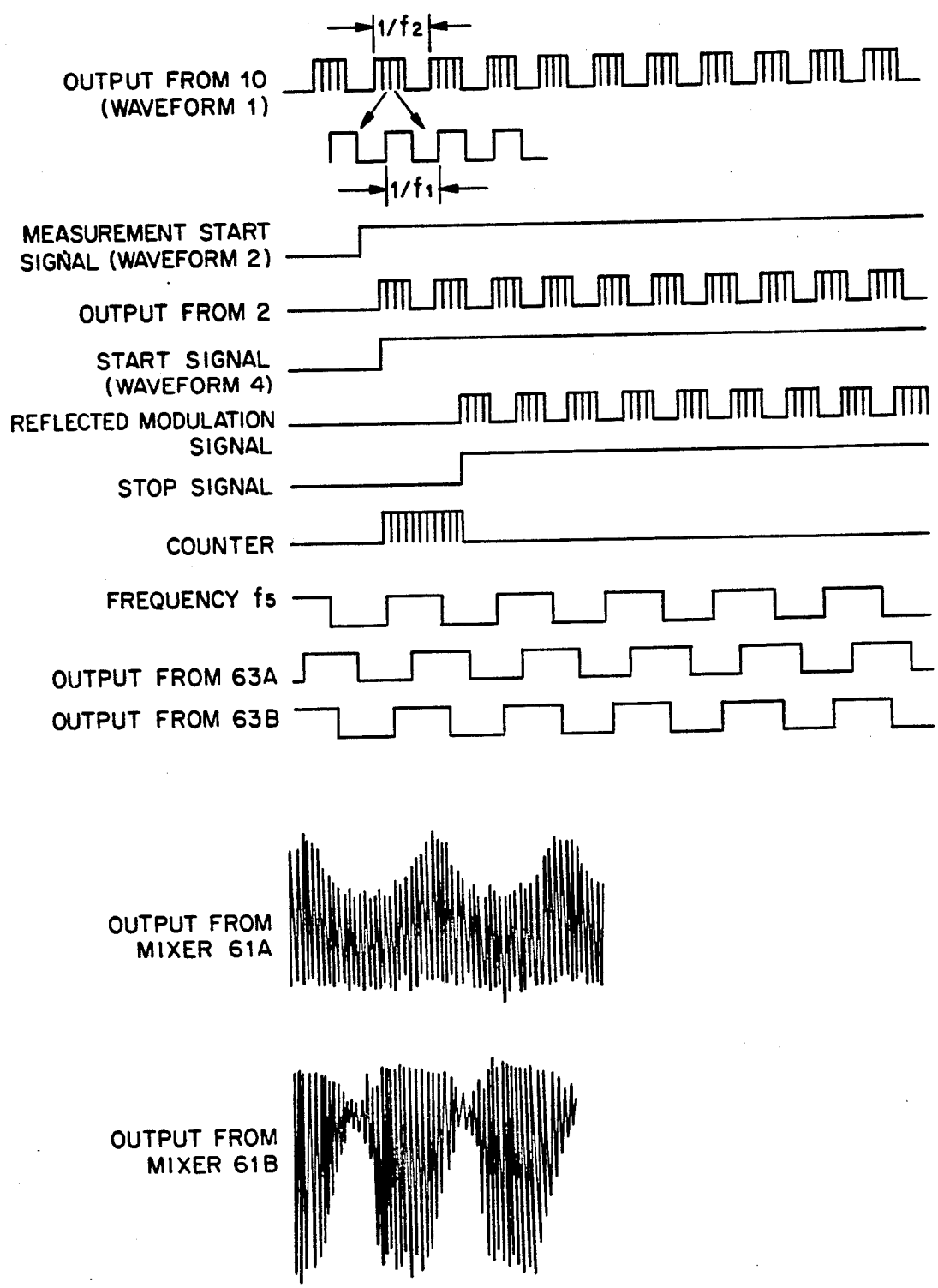
FIG. 12 is a waveform chart illustrating the operation of the sixth preferred embodiment.

Referring to FIG. 11 which shows a construction of an electro-optical distance meter according to the sixth preferred embodiment of the present invention, the electro-optical distance meter is comprised of a reference signal generator 1, synchronizing circuit 2, driving circuit 3, light emitting means 4, light receiving means 5, first phase difference detecting means 6A, second phase difference detecting means 6B, lag time measuring means 7, microcomputer 8, first frequency divider 91, second frequency divider 92, and AND circuit 10.

The synchronizing circuit 2 is provided to input an AND output of the signal having the frequency $f_1$ from the reference signal generator 1 and the signal having the frequency $f_2$ from the first frequency divider 91 and generate a signal synchronized with the signal having the frequency $f_2$ from the first frequency divider 91. The driving circuit 3 is provided to drive the light emitting means 4, and it can drive the light emitting means 4 according to the synchronous signal from the synchronizing circuit 2. The light receiving means 5 is a photoelectric conversion element for receiving a modulation light reflected by a reflecting mirror located at a measuring point. A reflected modulation signal obtained by the light receiving means 5 is amplified by a first amplifier 51, and is then supplied to the first and second phase difference detecting means 6A and 6B and the lag time measuring means 7.

As the constructions of the reference signal generator 1 and the first and second phase difference detecting means 6A and 6B are similar to those employed in the second preferred embodiment, the explanation thereof will therefore be omitted hereinafter.

Further, as the construction of the lag time measuring means 7 is similar to that employed in the first preferred embodiment, the explanation thereof will therefore be omitted hereinafter.

The operation of the sixth preferred embodiment constructed above will now be described with reference to FIGS. 11 and 12.

A signal having the frequency $f_1$ is supplied from the reference signal generator 1 to the AND circuit 10. Further, the signal having the frequency $f_1$ from the reference signal generator 1 is divided in frequency by the first frequency divider 91 to obtain a signal having the frequency $f_2$, which signal is in turn supplied to the AND circuit 10. Accordingly, the AND circuit 10 forms an AND signal (waveform 1) of the signal having the frequency $f_1$ from the reference signal generator 1 and the signal having the frequency $f_2$ from the first frequency divider 91. Then, such a multiplex modulation signal of the frequency $f_1$ and the frequency $f_2$ (i.e., the AND signal) is supplied to the synchronizing circuit 2, and is synchronized with the signal having the frequency $f_2$ from the first frequency divider 91. When a measurement start signal (waveform 2) is output from the microcomputer 8 to the synchronizing circuit 2, the multiplex modulation signal of the frequency $f_1$ and the frequency $f_2$ is supplied from the synchronizing circuit 2 to the driving circuit 3, and simultaneously a start signal (waveform 4) is supplied from the synchronizing circuit 2 to the counter 72 of the lag time measuring means 7.

The light emitting means 4 is driven by the driving circuit 3 according to the multiplex modulation signal input into the driving circuit 3 to generate a multiplex modulation light. The multiplex modulation light generated from the light emitting means 4 is reflected by the reflecting mirror located at the measuring point, and is received by the light receiving means 5. The light receiving means 5 carries out photoelectric conversion to form a reflected multiplex modulation signal. The reflected multiplex modulation signal is amplified by the first amplifier 51, and is then supplied to the first and second phase difference detecting means 6A and 6B. At the same time, the reflected multiplex modulation signal amplified by the first amplifier 51 is further amplified by a second amplifier 52, and is then supplied to the lag time measuring means 7.

The lag time measuring means 7 operates in the same manner as that in the first preferred embodiment, and the explanation thereof will therefore be omitted hereinafter. The time lag measuring means 7 and the microcomputer 8 correspond to the second distance measuring means of the present invention.

The first and second phase difference detecting means 6A and 6B operate in the same manner as those in the second preferred embodiment, and the explanation thereof will therefore be omitted hereinafter.

As described above, the sixth preferred embodiment adopts the construction of the second preferred embodiment for the first and second phase difference detecting means 6A and 6B, and also adopts the construction of the first preferred embodiment for the time lag measuring means 7.

Consequently, the microcomputer 8 synthesizes the three kinds of distances obtained from the first and second phase difference detecting means 6A and 6B and the time lag measuring means 7 to compute an accurate distance to be measured. That is, the distance less than 10 m is computed from the phase difference detected by the first phase difference detecting means 6A; the distance of 10 m to 1000 m is computed from the phase difference detected by the second phase difference detecting means 6B; and the distance more than 1000 m is computed from the lag time measured by the lag time measuring means 7. Accordingly, the accurate distance under the above conditions becomes 3752.5 m.

According to the sixth preferred embodiment as described above, fine measurement is carried out by the first and second phase difference detecting means 6A and 6B with use of the multiplex modulation signal of the frequency $f_1$ and the frequency $f_2$, and rough measurement is carried out by the lag time measuring means 7 with use of the same multiplex modulation signal of the frequency $f_1$ and the frequency $f_2$. Thus, the measurement can be carried out with a high accuracy by employing a single frequency. Accordingly, it is greatly advantageous that a measuring time can be shortened as compared with that in the conventional electro-optical distance meter using three frequencies.

It is readily appreciated that the values of the frequency $f_1$, the frequency $f_2$ and the oscillation frequency of the reference signal generator 1 are not limited to the above values mentioned in the sixth preferred embodiment, but they may be suitably selected.

According to a first aspect of the present invention, the signal generating means generates a modulation signal, and the light emitting means generates a modulation light according to the modulation signal generated from the signal generating means. The light receiving means receives the modulation light generated from the light emitting means and reflected by the reflecting means located at the measuring point to form a reflected modulation signal. Further, the phase difference detecting means detects a phase difference between the modulation signal generated from the light emitting means and the reflected modulation signal generated from the light receiving means to thereby carry out fine measurement of the distance. Moreover, the lag time measuring means measures a lag time between the modulation signal generated from the light emitting means and the reflected modulation signal generated from the light receiving means to thereby carry out rough measurement of the distance. By combining the results of the fine measurement and the rough measurement, the distance to the reflecting means located at the measuring point is measured with a high accuracy. That is, the distance can be finely measured by the phase difference detecting means, while the distance can be roughly measured by the lag time measuring means with use of the same frequency signal as that to be used for the phase difference detecting means, so that it is unnecessary to use another frequency signal for the rough measurement. Accordingly, even when the modulation frequency is time-divisionally used for every modulation wavelength, it is greatly advantageous that a measuring time can be shorted because the kind of the modulation frequency is reduced.

Furthermore, as the rough measurement is carried out by utilizing the lag time, a distance to be measured is unlimited so far as the light generated from the light emitting means is reflected.

According to a second aspect of the present invention, the signal generating means generates a multiplex modulation signal, and the light emitting means generates a multiplex modulation light according to the modulation signal generated from the signal generating means. The light receiving means receives the multiplex modulation light generated from the light emitting means and reflected by the reflecting means to form a reflected multiplex modulation signal. The first phase signal forming means forms a first phase signal containing a phase component of a first modulation signal from the reflected multiplex modulation signal, and the second phase signal forming means forms a second phase signal containing a phase component of a second modulation signal, which is different in frequency from the first modulation signal, from the reflected multiplex modulation signal. Further, the distance measuring means measures the distance to the measuring point with use of a phase difference between the first phase signal and a reference signal corresponding to the multiplex modulation signal and with use of a phase difference between the second phase signal and the reference signal.

According to the second aspect of the present invention, the signal generating means generates a multiplex amplitude or phase modulation signal having a plurality of frequency components. The first local oscillator forms a third frequency signal having a third frequency slightly different from a first frequency in the plural frequency components of the multiplex amplitude or phase modulation signal, and the first mixing means mixes the third frequency signal with the reflected multiplex modulation signal to form the first phase signal. Further, the second local oscillator forms a fourth frequency signal having a fourth frequency slightly different from a second frequency in the plural frequency components of the multiplex amplitude or phase modulation signal, the second frequency being different from the first frequency, and the second mixing means mixes the fourth frequency signal with the reflected multiplex modulation signal to form the second phase signal.

According to the second aspect of the present invention, the signal generating means generates a multiplex frequency modulation signal having a plurality of frequency components. The first local oscillator forms a third frequency signal, and the first mixing means mixes the third frequency signal with the reflected multiplex modulation signal to form the first phase signal. The third frequency signal has a frequency such that a frequency of the first phase signal formed by the first mixing means becomes equal to a frequency of the reference signal. The second local oscillator forms a fourth frequency signal, and the second mixing means mixes the fourth frequency signal with the reflected multiplex modulation signal to form the second phase signal. The fourth frequency signal has a frequency such that a frequency of the second phase signal formed by the second mixing means becomes equal to a frequency of the reference signal.

The first mixing means may include a first low-pass filter for extracting the first phase signal having the same frequency as that of the reference signal, and the second mixing means may include a second low-pass filter for extracting the second phase signal having the same frequency as that of the reference signal.

Accordingly, the modulation waves of different frequencies can be simultaneously generated, and the phase differences can be simultaneously measured with use of the same multiplex modulation signal by the independent hardwares. It is greatly advantageous that a measuring time can be shortened as compared with that in the conventional electro-optical distance meter time-divisionally using three frequencies. Particularly, the second aspect of the present invention is greatly effective in a high-speed measuring mode (tracking measurement) in a distance meter requiring a wide measuring range in a short time.

According to a third aspect of the present invention, the signal generating means generates a multiplex modulation signal with a first frequency and a second frequency, and the light emitting means generates a multiplex modulation light according to the multiplex frequency signal. The light receiving means receives the multiplex modulation light generated from the light emitting means and reflected by the reflecting means located at the measuring point to form a reflected multiplex modulation signal. The first local oscillator forms a third period signal having a third frequency slightly different from the first frequency, and the second local oscillator forms a fourth period signal having a fourth frequency slightly different from the second frequency. The first mixer mixes the reflected multiplex modulation signal generated from the light receiving means with the third period signal to form a first synthetic signal, and the second mixer mixes the reflected multiplex modulation signal generated from the light receiving means with the fourth period signal to form a second synthetic signal. The first low-pass filter extracts a predetermined frequency component from the first synthetic signal, and the second low-pass filter extracts the predetermined frequency component from the second synthetic signal. The first phase difference measuring means measures a first phase difference between the first synthetic signal passed through the first low-pass filter and a signal corresponding to a reference signal generated from the signal generating means, and the second phase difference measuring means measures a second phase difference between the second synthetic signal passed through the second low-pass filter and the signal corresponding to the reference signal generated from the signal generating means. The first distance measuring means finely measures the distance to the measuring point with use of the first phase difference and the second phase difference, and the second distance measuring means measures a lag time between the multiplex modulation signal generated from the light emitting means and the reflected multiplex modulation signal generated from the light receiving means to thereby roughly measure the distance to the measuring point.

Accordingly, it is unnecessary to use another frequency signal for the rough measurement. Further, as the two frequency signals are multiplexed, the phase differences for two different wavelengths can be simultaneously measured. Further, as the measurement of the phase difference and the measurement of the lag time are carried out by the respective independent hardwares, a distance measuring time can be shorted. Particularly, it is greatly advantageous that the measurement of the distance can be completed in a shorter time for one wavelength as compared with the distance measuring time in the prior art.

Moreover, as the rough measurement is carried out by utilizing the lag time, a distance to be measured is unlimited so far as the light generated from the light emitting means is reflected.

What is claimed is:

1. A distance measuring device for measuring a distance by detecting a reflected light from reflecting means located at a measuring point; said distance measuring means comprising signal generating means for generating a multiplex modulation signal; light emitting means for generating a multiplex modulation light according to said modulation signal generated from said signal generating means; light receiving means for receiving said multiplex modulation light generated from said light emitting means and reflected by said reflecting means to form a reflected multiplex modulation signal; first phase signal forming means for forming a first phase signal containing a phase component of a first modulation signal from said reflected multiplex modulation signal; second phase signal forming means for forming a second phase signal containing a phase component of a second modulation signal, which is different in frequency from said first modulation signal, from said reflected multiplex modulation signal; and distance measuring means for measuring said distance to said measuring point with use of a phase difference between said first phase signal and a reference signal corresponding to said multiplex modulation signal and with use of a phase difference between said second phase signal and said reference signal.

2. The distance measuring device according to claim 1, wherein said signal generating means generates a multiplex amplitude or phase modulation signal having a plurality of frequency components; said first phase signal forming means comprises a first local oscillator for forming a third frequency signal having a third frequency slightly different from a first frequency in said plural frequency components of said multiplex amplitude or phase modulation signal, and first mixing means for mixing said third frequency signal with said reflected multiplex modulation signal to form said first phase signal; and said second phase signal forming means comprises a second local oscillator for forming a fourth frequency signal having a fourth frequency slightly different from a second frequency in said plural frequency components of said multiplex amplitude or phase modulation signal, said second frequency being different from said first frequency, and second mixing means for mixing said fourth frequency signal with said reflected multiplex modulation signal to form said second phase signal.

3. The distance measuring device according to claim 1, wherein said signal generating means generates a multiplex frequency modulation signal having a plurality of frequency components; said first phase signal forming means comprises a first local oscillator for forming a third frequency signal, and first mixing means for mixing said third frequency signal with said reflected multiplex modulation signal to form said first phase signal; said third frequency signal has a frequency such that a frequency of said first phase signal formed by said first mixing means becomes equal to a frequency of said reference signal; said second phase signal forming means comprises a second local oscillator for forming a fourth frequency signal, and second mixing means for mixing said fourth frequency signal with said reflected multiplex modulation signal to form said second phase signal; and said fourth frequency signal has a frequency such that a frequency of said second phase signal formed by said second mixing means becomes equal to a frequency of said reference signal.

4. The distance measuring means according to claim 2 or 3, wherein said first mixing means includes a first low-pass filter for extracting said first phase signal having the same frequency as that of said reference signal, and said second mixing means includes a second low-pass filter for extracting said second phase signal having the same frequency as that of said reference signal.

5. A distance measuring device for measuring a distance by detecting a reflected light from reflecting means located at a measuring point; said distance measuring means comprising signal generating means for generating a multiplex modulation signal with a first frequency and a second frequency; light emitting means for generating a multiplex modulation light according to said multiplex frequency signal; light receiving means for receiving said multiplex modulation light generated from said light emitting means and reflected by said reflecting means to form a reflected multiplex modulation signal; a first local oscillator for forming a third period signal having a third frequency slightly different from said first frequency; a second local oscillator for forming a fourth period signal having a fourth frequency slightly different from said second frequency; a first mixer for mixing said reflected multiplex modulation signal generated from said light receiving means with said third period signal to form a first synthetic signal; a second mixer for mixing said reflected multiplex modulation signal generated from said light receiving means with said fourth period signal to form a second synthetic signal; a first low-pass filter for extracting a predetermined frequency component from said first synthetic signal; a second low-pass filter for extracting said predetermined frequency component from said second synthetic signal; first phase difference measuring means for measuring a first phase difference between said first synthetic signal passed through said first low-pass filter and a signal corresponding to a reference signal generated from said signal generating means; second phase difference measuring means for measuring a second phase difference between said second synthetic signal passed through said second low-pass filter and said signal corresponding to said reference signal generated from said signal generating means; first distance measuring means for finely measuring said distance to said measuring point with use of said first phase difference and said second phase difference; and second distance measuring means for measuring a lag time between said multiplex modulation signal generated from said light emitting means and said reflected multiplex modulation signal generated from said light receiving means to thereby roughly measure said distance to said measuring point.

* * * * *

UNITED STATES PATENT AND TRADEMARK OFFICE
CERTIFICATE OF CORRECTION

PATENT NO. : 5,194,906
DATED : March 16, 1993
INVENTOR(S) : Kimura et al.

It is certified that error appears in the above-identified patent and that said Letters Patent is hereby corrected as shown below:

Column 11, line 32, "having" should read --having the frequency $f_3$ from the third reference signal generator 1C, and alternately outputs the signal having--.

Signed and Sealed this

Seventh Day of December, 1993

*Attest:*

BRUCE LEHMAN

*Attesting Officer*  Commissioner of Patents and Trademarks